United States Patent [19]

Osada et al.

[11] 4,351,009
[45] Sep. 21, 1982

[54] APPARATUS FOR MOVING THE PINCH ROLLER AND THE MAGNETIC HEAD OF A TAPE RECORDER

[75] Inventors: Hajime Osada; Akiteru Kimura, both of Fuchu; Tokuo Shimizu; Goro Kitajima, both of Hachioji; Yoshio Tomizawa, Tama; Makoto Kondo, Fuchu; Kazuyasu Motoyama; Masaaki Daigaku, both of Hachioji, all of Japan

[73] Assignee: Olympus Optical Co., Ltd., Japan

[21] Appl. No.: 147,712

[22] Filed: May 8, 1980

[30] Foreign Application Priority Data

Jun. 19, 1979 [JP] Japan .................................. 54-77139

[51] Int. Cl.³ ............................................. G11B 21/02
[52] U.S. Cl. ....................................... 360/105; 360/90
[58] Field of Search ................... 360/105, 104, 90, 93, 360/130.32

[56] References Cited

U.S. PATENT DOCUMENTS

| | | | |
|---|---|---|---|
| 3,472,516 | 10/1969 | Rhoades | 360/105 |
| 3,825,949 | 7/1974 | Pyles | 360/105 |
| 4,031,556 | 6/1977 | Ban | 360/105 |
| 4,071,859 | 1/1978 | Sami | 360/105 |
| 4,167,764 | 9/1979 | Harajima | 360/105 |

*Primary Examiner*—Alan Faber
*Attorney, Agent, or Firm*—Ostrolenk, Faber, Gerb & Soffen

[57] ABSTRACT

An apparatus for moving the pinch roller and the magnetic head of a tape recorder into their operative positions comprises a small size motor which supplies a drive to a pair of drive and driven members such as the combination of a pinion and a rack. The drive is transmitted via the pair of members to a movable member which carries the pinch roller and magnetic head, thus moving the pinch roller and the magnetic head to their operative positions.

4 Claims, 4 Drawing Figures

APPARATUS FOR MOVING THE PINCH ROLLER AND THE MAGNETIC HEAD OF A TAPE RECORDER

BACKGROUND OF THE INVENTION

The invention relates to an apparatus for moving the pinch roller and the magnetic head of a tape recorder, and more particularly, to such apparatus which moves the pinch roller into abutment against a capstan with a magnetic tape held therebetween, which tape is caused to run by means of the rotation of the capstan being transmitted thereto, and in which the magnetic head is brought into contact with the magnetic tape.

In general, a tape recorder includes a capstan and a pinch roller between which a magnetic tape is held so that the rotation of the capstan is transmitted to the tape to drive the tape. When this condition is achieved, a magnetic head is brought into contact with the tape. To achieve such an arrangement, it is necessary that the pinch roller be moved away from the capstan to permit a magnetic tape to be loaded therebetween, and to move the pinch roller into abutment against the capstan with the tape held therebetween. An arrangement is made such that as the pinch roller moves in this manner, the magnetic head is also driven to move into contact with the magnetic tape when the pinch roller is brought into abutment against the capstan with the tape held therebetween. However, when the pinch roller is spaced from the capstan, the magnetic head is also spaced from the tape.

A drive mechanism which achieves such movement of the pinch roller and the magnetic head relative to the capstan and the magnetic tape, respectively, typically utilizes an electromagnetic solenoid. However, it will be appreciated that an arrangement utilizing such a solenoid is disadvantageously bulky as well as heavy. Another arrangement is also known which is of a lever type, including a lever driven in response to the operation of a mode switching pushbutton or slide button to move a movable plate on which the pinch roller and the magnetic head are carried. The arrangement of the lever type is complex in construction and requires a relatively large number of parts.

SUMMARY OF THE INVENTION

It is an object of the invention to provide an apparatus for moving a pinch roller and a magnetic head of a tape recorder which eliminates the above disadvantages by utilizing a small size motor as a drive source in order to move a movable member carrying a capstan and a magnetic head to its operative position.

In accordance with the invention, the use of a small size motor to operate a pinch roller and a magnetic head to their operative positions simplifies the arrangement and reduces the space requirement. The number of parts required is reduced, providing an economical advantage and achieving a reduced weight.

DESCRIPTION OF PREFERRED EMBODIMENTS

Figure 1:
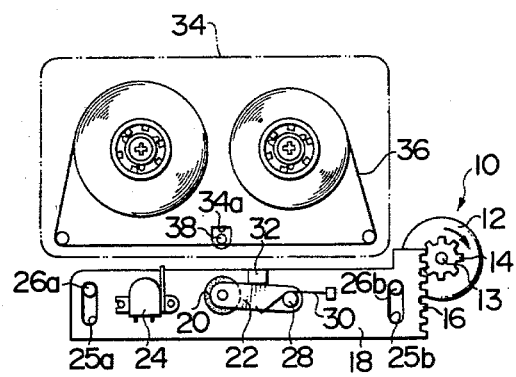
FIG. 1 is a schematic plan view of an apparatus for moving the pinch roller and the magnetic head of a tape recorder according to one embodiment of the invention.

Referring to FIG. 1, there is shown an apparatus for moving a pinch roller and a magnetic head of a tape recorder constructed in accordance with the invention and which includes a small size motor 12. The motor 12 has an output shaft 13 on which a pinion 14 is integrally mounted and is disposed in meshing engagement with a rack formed along the right-hand edge of a movable member 18 on which a pinch roller 20 and a magnetic head 24 are mounted. The movable member 18 is in the form of a transversely elongate flat plate provided with an upright pin 28 which pivotally mounts one end of a transversely extending support member 22, the free end of which rotatably carries the pinch roller 20. A torsion spring 30 is disposed on the pin 28 and urges the support member 22 to rotate clockwise about the pin 28, but the resulting angular movement is normally blocked by the abutment thereof against a stop 32. The magnetic head 24 is fixedly mounted on the movable plate 18 to the left of the pinch roller 20, by means of set screws. Adjacent to its opposite ends, the movable member 18 is formed with a pair of guide slots 25a, 25b which are elongate in a direction perpendicular to the length of the movable plate and which are engaged by guide pins 26a, 26b, respectively, fixedly mounted on a stationary member, not shown.

A tape cassette 34 of a form which is known in itself is disposed in opposing relationship with the movable member 18, and includes a magnetic tape 36 which is maintained in taut condition. An aperture 34a for receiving a capstan is centrally formed in the forward end of the cassette 34, and a capstan 38 to which a drive from a motor, not shown, is transmitted extends through the aperture. The tape 36 is maintained in abutment against the capstan 38.

Figure 2:
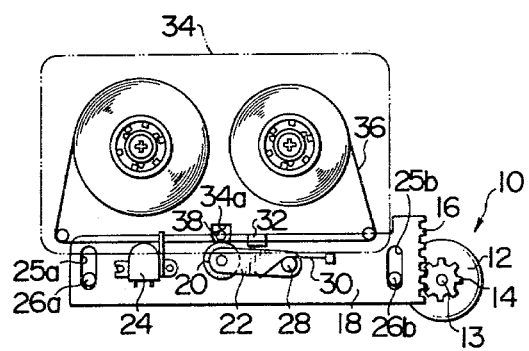
FIG. 2 illustrates the apparatus in its operative position.

In the embodiment shown, an apparatus for moving the capstan and the magnetic tape includes a drive mechanism 10 which is formed by the motor 12, the pinion 14 and the rack 16. In the condition shown in FIG. 1, the clockwise rotation of the motor 12 acts through the combination of the rack 16 and the pinion 14 to cause a translational movement of the movable member 18 in a direction toward the cassette 34 until the position shown in FIG. 2 is reached, whereupon it comes to a stop. In this position, the pinch roller 20 is brought into abutment against the capstan 38 through the tape 36 interposed therebetween, and the magnetic head 24 is brought into contact with the magnetic tape 36. In the position shown in FIG. 2, the resilience of spring 30 urges the pinch roller 20 in a direction to bias the tape 36 strongly against the capstan 38. In this manner, the rotation of the capstan 38 is transmitted to the tape 36, which therefore begins to run. The head 24 is maintained in contact with the running tape 36 to perform a recording or playback operation.

Figure 3:
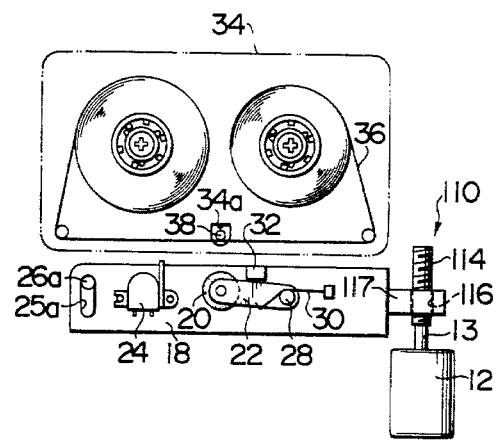
FIGS. 3 and 4 are plan views of other embodiments of the invention.

FIG. 3 shows another embodiment of the invention utilizing a different arrangement for the drive mechanism. In other respects, the arrangement is similar to that shown in FIG. 1, and hence corresponding parts are designated by like reference characters and will not be described.

FIG. 3 shows a drive mechanism 110 in the form of a lead screw assembly. Specifically, it comprises a lead screw 114 integrally connected to the output shaft 13 of the motor 12, and a nut 116 threadably engaging the screw 114 and fixedly mounted on the right-hand end of the movable member 18 by means of a fastener 117. In this embodiment, the rotation of the motor 12 causes a corresponding rotation of the screw 114, which then causes a translational movement of the nut 116 in a direction to bring the movable member 18 toward the cassette 34. In this manner, the pinch roller 20 is again brought into abutment against the capstan 38 with the tape 36 interposed therebetween, and the head 24 is brought into contact with the tape 36. In the embodiment of FIG. 3, only one guide slot and only one guide pin are provided as shown at 25a and 26a, while the combination of the screw 114 and the nut 116 serves the function of the other guide slot and the other guide pin.

Figure 4:
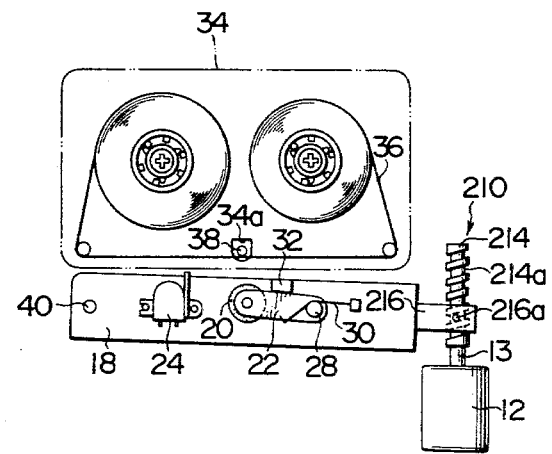

FIG. 4 shows a further embodiment of the drive mechanism which utilizes a helical cam groove and a pin. The drive mechanism 210 comprises a cylindrical drive member 214 fixedly connected to the output shaft 13 of the motor 12 and having a helical cam groove 214a formed in its periphery, and a driven member 216 fixedly connected to the right-hand of the movable member 18 and carrying a pin 216a which engages the cam groove 214a. It will be seen that as the motor 12 is driven for rotation, the driven member 216 is driven by means of the combination of the cam groove 214a and the pin 216a to move the movable member 18 toward the cassette 34 until the pinch roller 20 and the magnetic head 24 thereon are brought into engagement with the capstan 38 and the magnetic tape 36, respectively. In the embodiments shown in FIGS. 1 and 3, the guide slots 25a, 25b and guide pins 26a, 26b are used to guide the movable member 18 for translational movement, but in the embodiment of FIG. 4, one end of the movable member 18 is pivotally mounted on a pin 40 while the free end or the right-hand end of the movable member 18 is driven angularly by the combination of the drive and the driven member 214, 216 to cause a movement of the movable member 18.

As discussed above, the drive mechanism used in the apparatus of the invention utilizes the small size motor 12 which supplies a drive to cause a translational movement of the movable member 18 on which the pinch roller and the magnetic head are mounted, either through the combination of the rack 16 and pinion 14, the combination of the lead screw 114 and the nut 116, or the combination of the helical cam groove 214a in the drive member 214 and the pin 216a on the driven member 216. In this manner, a translational movement of the movable member is achieved with a simple arrangement.

In the embodiments shown in FIGS. 1 to 4, the motor 12 is fixedly mounted on a stationary member of the tape recorder, and thus is blocked against movement. However, the same result can be achieved by mounting the motor 12 on the movable member 18 for cooperation with rack 16, nut 116 or driven member 216 which is fixedly mounted on a stationary part of the tape recorder.

What is claimed is:

1. An apparatus for moving a pinch roller and a tape head located in a tape recorder relative to a capstan of said tape recorder, said apparatus comprising:
    (A) a capstan located in said tape recorder;
    (B) a movable member carrying a pinch roller and a tape head, said member being movable between a first position wherein said pinch roller abuts said capstan and said tape head is in an operative position and a second position wherein said pinch roller is spaced from said capstan and said tape head is away from said operative position; and
    (C) a drive mechanism for moving said movable member between said first and second positions, said drive mechanism including:
        (1) a drive member;
        (2) a driven member directly connected to said drive member and directly connected to the movable member; and
        (3) a motor having an output shaft to which said drive member is directly fixed for imparting a drive force to said drive and driven members, said drive member directly driving said driven member to move said movable member between said first and second positions responsive to said driving force.

2. An apparatus according to claim 1, in which said drive and driven members comprise a pinion fixedly mounted on said output shaft of said motor, and a rack mounted on said movable member, respectively, said rack being in meshing engagement with said pinion.

3. An apparatus according to claim 1, in which said drive and driven members comprise a lead screw fixedly connected to said output shaft of said motor, and a nut mounted on said movable member, respectively, said nut being in threadable engagement with said screw.

4. An apparatus according to claim 1, in which said drive and driven members comprise a cylindrical drive member fixedly connected to said output shaft of said motor and having a helical cam groove formed in its periphery, and a driven member mounted on said movable member and carrying a pin which engages said cam groove in said cylindrical drive member, respectively.

* * * * *